Jan. 17, 1939.  W. J. PARKINSON  2,143,997
VEHICLE OBSTRUCTION INDICATOR
Filed Aug. 11, 1934   2 Sheets-Sheet 2
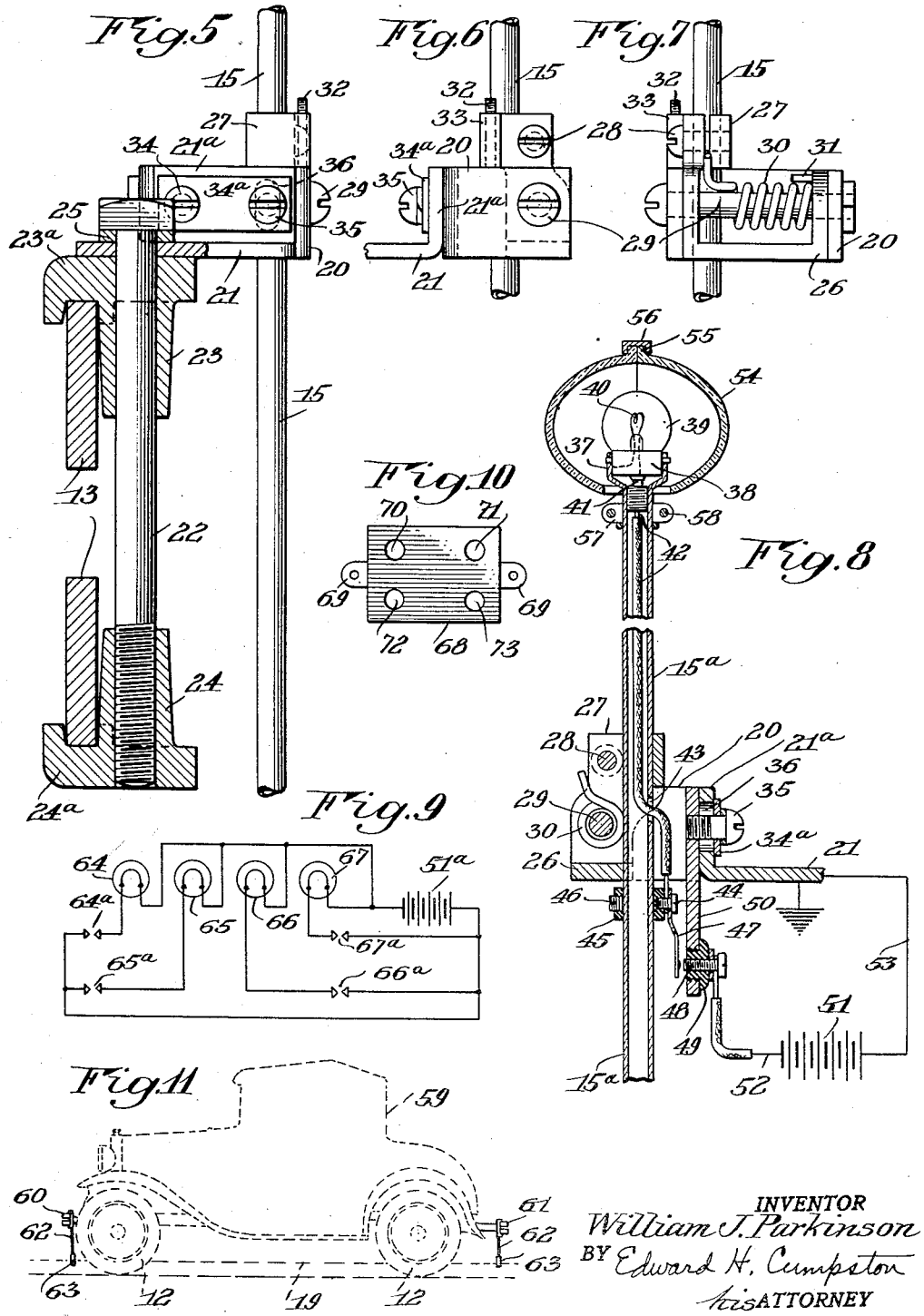

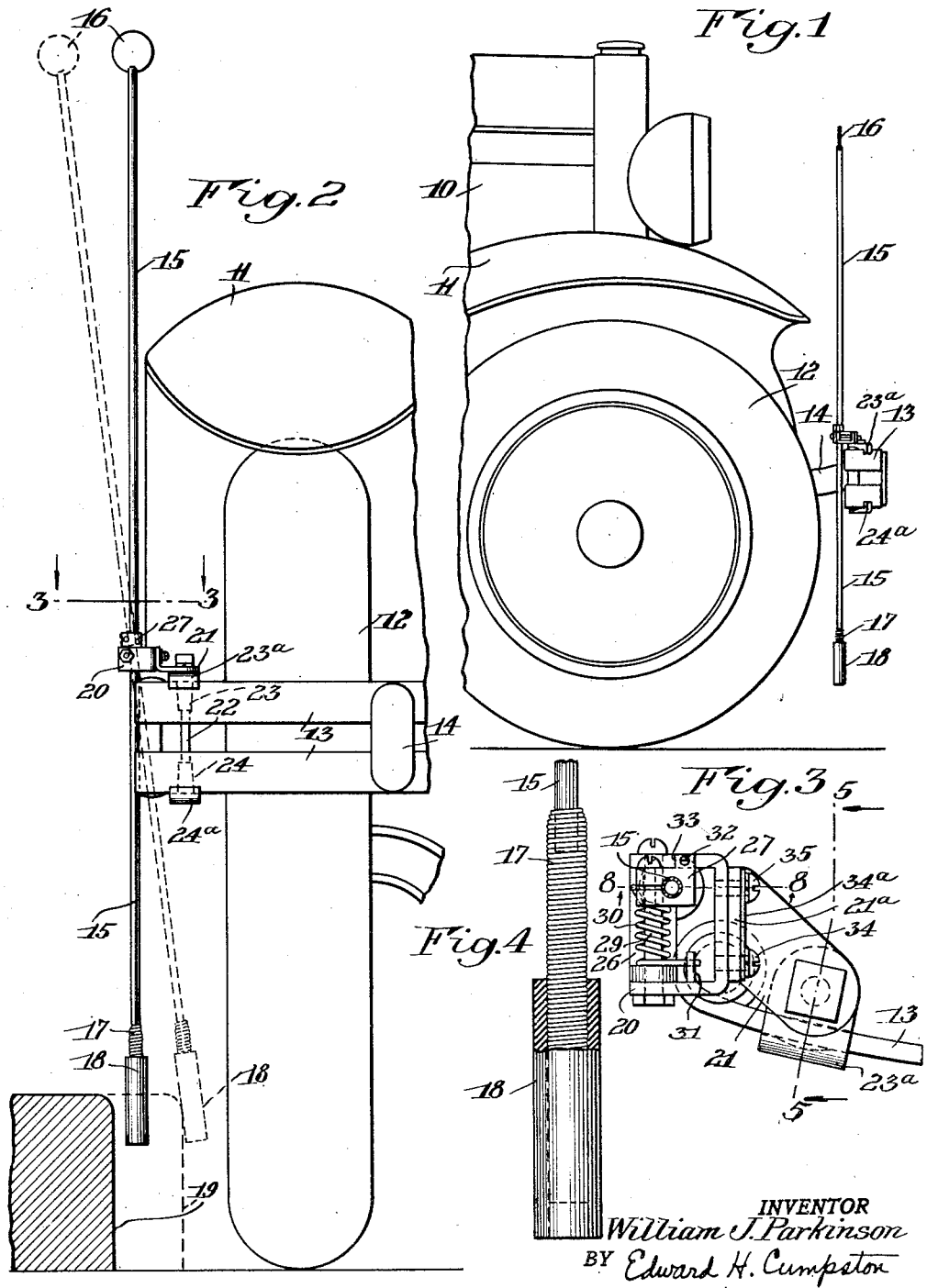

Patented Jan. 17, 1939

2,143,997

UNITED STATES PATENT OFFICE 2,143,997

VEHICLE OBSTRUCTION INDICATOR

William J. Parkinson, Irondequoit, N. Y.

Application August 11, 1934, Serial No. 739,428

25 Claims. (Cl. 177—311)

The present invention relates to a vehicle obstruction indicator and embodies means for indicating to a driver or occupant of a vehicle its proximity to an object or obstruction when the vehicle is moved to a predetermined position relative thereto. One example of the usefulness of such a device is its movement, through engagement with a street curbing, to afford an indication of the position of the vehicle relative to the curbing when attempting to park adjacent thereto.

One object of the invention is to provide improved indicating means of this class which is simple in construction, efficient in service, and comparatively inexpensive to manufacture.

A further object of the invention is to provide a flexible device of this character including one or more parts which will readily yield when engaging or operating in contact with an obstruction or object, whereby to avoid damaging any part of the device, thus increasing its life and insuring satisfactory operation of the same.

Another object of the invention is to provide a simplified device of the class described having adjustable indicating and securing parts for varying its position of operation and for accommodating it to different supporting devices such, for example, as different types of bumpers applied to automobiles of different makes.

A further object of the invention is to provide improved indicating means normally in position upon a vehicle to be operated by an object relative to which the vehicle is moving for indicating when the vehicle is at a predetermined position relative to the object.

A further object of the invention is the provision of a movable signal or indicating means attached to the vehicle and having flexible operating means in position to be engaged and operated by an object in proximity to which it is desired to move or park the vehicle and in which the indicating means is automatically returned to normal position when the operating means is freed through disengagement with the object.

A further object of the invention is to provide on the bumper or other part of a motor vehicle means for use in parking the vehicle adjacent a curbing, comprising an indicator having an operating part for engagement with the curbing to move the indicator whereby to notify the driver of the vehicle of the position of the latter relative to the curbing.

A further object of the invention is to provide on the vehicle a movable indicating lamp for use in parking the vehicle adjacent a curbing, having operating means for engagement with the curbing and a normally open switch for the lamp circuit adapted to be closed upon movement of the lamp by the operating means.

A further object of the invention is to provide one or more signaling or indicating lamps within or upon the vehicle body, together with switch means for closing the lamp circuit and operating means for the switch means positioned upon the vehicle for engagement with and operation by a curbing or other object adjacent to which the vehicle may be driven or parked from time to time.

To these and other ends the invention resides in certain improvements and combinations of parts, all as will be hereinafter more fully described, the novel features being pointed out in the claims at the end of the specification.

In the drawings:

Fig. 1 is a side elevation of the front end of a motor vehicle to which is shown applied one form of the invention;

Fig. 2 is a front elevation of a portion of the vehicle including one of the bumpers to which the indicating device is attached;

Fig. 3 is a horizontal section taken on line 3—3 of Fig. 2;

Fig. 4 is a fragmentary part sectional elevation of the lower end of the indicator shown in Fig. 2;

Fig. 5 is a sectional elevation on line 5—5 of Fig. 3 showing the bracket means and associated parts for attaching the indicator to the bumper;

Fig. 6 is a fragmentary elevation of the bracket shown in Fig. 5 as viewed from the right of the latter;

Fig. 7 is an elevation of the bracket as viewed from the right of Fig. 6;

Fig. 8 is a fragmentary sectional elevation taken on line 8—8 of Fig. 3 showing a lamp on the upper end of the movable indicator rod, and a switch for controlling the lamp circuit;

Fig. 9 is a diagrammatic view of a series of lamps for installation within the vehicle body and having circuit connections and switches individual to the lamps under the control of operating parts attached to the ends of the bumpers for engagement with the curb when parking a vehicle adjacent thereto in relatively different positions;

Fig. 10 is a front elevation of a housing for the lamps adapted for attachment to the instrument board of the vehicle;

Fig. 11 is a diagrammatic view of an automobile showing two of the switch operating parts, one being attached to one end of the front bumper, and the other to the corresponding end of the rear bumper.

The same reference numerals throughout the several views indicate the same parts.

The present invention embodies improved means for indicating to the driver of a vehicle its proximity or nearness to an obstruction or object relatively close to which it may be desired to position or park the vehicle from time to time.

The indicating means embodies a signal or movable part so placed as to attract the attention of the driver or other occupant of the vehicle when operated during movement of the vehicle. It may constitute one or more lamps placed on the instrument board of the vehicle or at other points if desired, or may be in the form of a movable disk, lens, or other object positioned inside or outside of the vehicle at any point desired. Its operation is effected, as previously stated, through engagement of an operating part with an obstruction or object when the vehicle is moved to a predetermined position relative to the latter.

In one form of the invention the indicating means is placed at the front and right side of the vehicle, preferably on the bumper, and in position to be operated through engagement of a depending portion with the curbing, in order that the driver may be advised of the position of the vehicle relative to the curbing when attempting to park adjacent thereto.

However, when it is preferred to employ lamps for signaling or indicating the position of the vehicle relative to the curbing or other obstruction, one or more may be employed, and, if desired, four of the lamps may be placed upon the instrument board and the circuits closed by switch means actuated by movable parts depending from the opposite ends of the front and rear bumpers of the vehicle through engagement of said parts with the curbing when attempting to park the vehicle either by forward or backward movement thereof on the right or left hand side of the street, two of such operating devices being shown diagrammatically in Fig. 11.

Referring to the drawings, 10 represents the hood, 11 the fender, and 12 one of the wheels of an automobile, the front bumper being indicated at 13, which is supported in the usual manner by arms or extensions on the vehicle frame, one of which is shown at 14, Fig. 1.

The indicating means shown in Figs. 1 to 7, inclusive, is preferably attached to the end of the front bumper at the right side of the car. The indicating means comprises an element 15, preferably in the form of a rod having a sight or indicator on its upper end which may comprise a disk 16, or other means, such as a colored lens, ball, or any object suitable for the purpose. The lower end of the rod has attached thereto, a flexible element 17, preferably comprising a coiled spring, within the upper end of which the rod is inserted and secured in any suitable manner. The lower end of the spring is positioned within a section of the flexible tubing 18 preferably formed of rubber which is adapted to come in contact with the curbing 19 or other obstruction adjacent to which the vehicle may be moved, as when parking the same.

The means for supporting the rod upon the bumper comprises a pair of brackets 20 and 21, the latter carrying the former and having a bolt 22 extending therethrough which also extends through the upper and lower members 23 and 24 for connecting the brackets with the bumper. The members 23 and 24 are provided with hook-shaped portions 23a and 24a which engage the upper and lower sections of the bumper respectively as shown in Fig. 5. The lower member 24 is threaded to receive the bolt and by tightening the latter both the upper and lower connecting members can be rigidly clamped upon the bumper sections, on which said members are held against turning by the hook-shaped portions thereof.

A spring washer 25 is preferably positioned under the head of the bolt as shown in Fig. 5 to prevent the bolt from working loose under vibration of the bumper when operating the vehicle.

The bracket 20 has mounted therein a U-shaped member 26 provided with an upstanding split lug 27 having a bore through which the indicating rod or element 15 is extended and within which it is held in the desired position of adjustment by a clamping screw 28 extending through the jaws of the lug as shown in Fig. 7, it being understood that when the screw is loosened the rod can be rotated to set the disk 16 or other indicating object which may be placed on the rod at a position at which it can best be seen by the driver of the vehicle. Furthermore, by loosening the clamping screw the rod can be adjusted vertically to accommodate it to the bumpers of different makes of cars which may be located at different distances from the ground, whereby to properly adjust the curb engaging portion 18 of the rod with respect to the ground or surface of the road. The U-shaped member 30 is pivotally supported by a bolt 29 extending through the side walls thereof and also through the side walls of the bracket member 20 which serve to support the bolt, as shown in Fig. 7.

The U-shaped member 26 is adapted to rock or swing within the bracket 20 about the axis of the bolt 29 when pressure is applied to the flexible member 18 on the lower end of the rod as when said member is moved into engagement with the curbing 19 or other obstruction with which it may come in contact, the result being that movement of the indicating object 16 will be effected to better indicate to the driver the position of the vehicle relative to the curbing in order that he may avoid the contacting of the tires therewith and any injury which might result from movement of the tires in engagement with the curbing, or other obstruction.

As soon as the vehicle is moved to a position at which the part 18 of the indicating rod or element is freed by the curbing, the rod will be automatically returned to normal position by the torsion spring 30 encircling the bolt 29 and held under tension through engagement of one of its ends with the lug 27 and the other with a pin 31 projecting inwardly from one of the side walls of the U-shaped member 26, Figs. 3 and 7.

Means is provided for adjusting the pivoted U-shaped member to maintain the indicating element supported thereby in normal vertical position when its operating portion is out of contact with the curbing or other obstruction. This means comprises a set screw 32 threaded within a lateral extension 33 on the rod receiving lug 27, the extension overlying one of the side walls of the bracket 20, as shown in Fig. 3, and the lower end of the screw being adapted to contact with said wall when turned in one direction whereby to shift the position of the U-shaped member and the indicating rod carried thereby as occasion may demand.

The extension 33 is preferably made to contact with the bracket 20 to form a stop for checking the movement of the pivoted U-shaped member under the tension of the spring 30, the set screw being adjusted for the purpose stated when it is found that the indicating rod is not in substantially vertical position after the parts have been properly assembled upon the bumper or other device which may be employed for attaching the indicating means to the vehicle frame or body.

The bracket 21 can be adjusted in a horizontal plane to swing the bracket 20 and the indicating means carried thereby to any preferred operating position, this being accomplished by loosening the bolt 22 and swinging the bracket 21 inwardly or outwardly about the axis thereof to properly adjust the part 18 for engagement with the curbing when the wheel 12 is at a predetermined position relative thereto.

Furthermore, means is provided for effecting relative adjustment between the brackets 20 and 21 to level up the former in order to adjust the indicating rod or element to a substantially vertical position when desired. The means for accomplishing this result comprises the screws 34 and 35 extending through the angularly disposed portion 21a of the bracket 21 and the plate or washer 34a into the wall of the bracket 20, as shown by dotted lines in Fig. 3. The screw 34 forms a pivot for the bracket 21 and the screw 35 a clamping member for the same, the portion 21a of said bracket being slotted at 36, Figs. 5 and 8, to allow for a limited swinging movement of the bracket 20 in order to move it to a horizontal position for the purpose stated.

In the modification shown in Fig. 8 the supporting means for the movable indicating rod is the same as that shown in Figs. 3, 5, 6, and 7, and the corresponding parts have therefore been given the same reference characters. It will be understood that the manner of moving and operating said supporting means and the indicating means thereon will be the same in both cases, the principal difference between the two devices being the addition of the lamp and the switch for controlling its circuit, shown more or less diagrammatically in Fig. 8. In this arrangement the tubular rod 15a has an enlarged portion 37 at its upper end for receiving a lamp holding member 38 carrying a lamp 39, the filament 40 of which has one of its ends suitably secured upon the enlarged end of the rod and the other connected with a metal part 41 on the lamp holding member 38. A wire 42 or other electrical connection is positioned within the rod and has its upper end suitably connected with the metal part 41. The wire 42 is carried through an opening 43 in the wall of the tubular rod and is secured by a binding screw 44 upon a collar 45 formed of insulating material and adjustably secured upon the rod by means of a set screw 46. A contact member 47 is clamped upon the lower end of the wire by means of the set screw 44. A second contact member 48 in the form of a screw is placed opposite the contact 47 for engagement therewith when the upper end of the rod is swung outwardly as indicated by dotted lines in Fig. 2. The contact 48 is carried by a bushing 49 formed of insulating material and supported by the depending portion 50 of the bracket 20, the latter being attached to the upstanding portion 21a of the pivoted bracket 21 by the screws 34 and 35, as shown in Fig. 3.

Current for lighting the lamp 39 may be obtained from any desired source such, for example, as a battery 51, which may be the storage battery of the vehicle to which the indicating means is attached. Extending from one side of the battery is a wire 52 connected with the fixed contact 48 and extending from the other side of the battery is a wire 53 connected with the bracket 21, or some other metal part of the vehicle frame or body suitable for establishing a "ground" to complete the circuit.

When the lamp carrying end of the rod 15a is swung outwardly through contact of the flexible member 18 on its lower end with the curbing 19, or other object in the path of said member, the movable contact 47 will engage the fixed contact 48 thereby closing the lamp circuit and causing the lamp to be illuminated as an indication to the driver of the vehicle of its proximity to the curbing, whereby sufficient time will be afforded to steer the vehicle in a manner to prevent the wheels from contacting with the curbing and becoming injured thereby. It will be understood that the lamp will be particularly advantageous as a means to facilitate parking adjacent the curbing at night although it is intended for use in the daytime as well.

The lamp is preferably provided with a suitable housing of any preferred design, which may comprise a pair of globe-like members 54, preferably formed of colored glass, one of which may be red and the other green, if desired, although glass of any other color may be used if preferred. The housing members 54 are provided with laterally extending portions 55 disposed in abutting relation and secured one upon another by a split clamping ring 56 of channel-shaped construction, the ends of the ring being recessed to receive the rod 15a and having oppositely positioned lugs 57 through which are extended bolts 58 for clamping the ends of the ring upon the rod.

The modification shown in Figs. 9, 10, and 11, comprises an arrangement in which four lamps are provided, preferably on the instrument board of the vehicle, a corresponding number of control members for the circuits of the lamps being applied preferably to the ends of the front and rear bumpers for operation through engagement with the curbing to close the respective lamp circuits under different conditions of parking as described hereinafter.

In Fig. 11 an automobile 59 is shown diagrammatically by dotted lines and is provided with front and rear bumpers 60 and 61 respectively, suitably connected with and supported by the frame of the vehicle. The opposite ends of the bumpers are provided with depending elements 62, said elements having at their lower ends suitable operating means 63 preferably comprising flexible parts similar to those shown at 17 and 18 in Figs. 2 and 4 of the drawings, it being understood that said elements will also have circuit controlling switches associated therewith for controlling the circuits of the lamps 64, 65, 66, and 67, shown in Fig. 9, said switches being similar to the one shown in Fig. 8, whereby to complete the circuits of the different lamps when the depending parts 62 are operated through engagement of the flexible parts 63 with the curbing when parking the vehicle in different positions adjacent to the curbing.

The switches for closing the circuits of the lamps 64 to 67, inclusive, are indicated at 64a to 67a respectively, current for the lamp circuits being supplied by a suitable storage battery 51a, preferably the storage battery with which the vehicle is ordinarily equipped.

It will be understood that the lamp shown in Fig. 8 and the portion of the rod for supporting the same which extends above the bumper, will be omitted in the arrangement shown in Fig. 11, since in this arrangement the lamps are placed inside of the vehicle body, preferably on the instrument board and within a suitable housing, such, for example, as the one shown in elevation in Fig. 10 and designated by the reference character 68, said housing having brackets 69 at its opposite ends for supporting it upon the instrument board, not shown.

The housing is provided with openings 70 to 73, inclusive, for the lamps shown in Fig. 9. The openings 70 and 71 preferably correspond to the lamps controlled by the switches on the right and left ends of the front bumper respectively, as viewed from the driver's seat, while the openings 72 and 73 correspond to the lamps controlled by the switches on the right and left ends of the rear bumper.

The purpose of providing the four signaling lamps 64 to 67, inclusive, within the vehicle body is to afford means for indicating to the driver the approach or proximity of the vehicle to the curbing under different parking conditions. Under ordinary parking conditions or, in other words, when parking in the usual manner at the right side of the street, the switch controlling means depending from the end of the front bumper at the right side of the vehicle will engage and be operated by the curbing as the vehicle is moved into close proximity thereto, whereby the driver will be notified, through the flashing of the lamp within the housing 68 opposite the opening 71, of the position of the vehicle relative to the curbing in order that he may properly steer the vehicle to prevent the front wheel from contacting with the curbing.

In cases, however, where the vehicle is parked with the left side next to the curbing, the depending switch control means on the left end of the front bumper will likewise engage and be operated by the curbing, whereby the lighting or flashing of the lamp will be viewed through the opening 70 in the front wall of the lamp housing.

It will be understood that the switch control devices depending from the ends of the rear bumper will operate in the manner above described when backing the vehicle, that is when parking by backing up in the direction of the curbing on the right side of the street, the depending switch controlling means on the end of the rear bumper nearest the curb will engage the latter to effect closing of the switch and illumination of the lamp opposite the opening 73 of the housing 68. Likewise if the driver is attempting to park by backing up in the direction of the curbing on the left side of the street, the depending switch control means on the rear bumper nearest the curbing will be operated by the latter and the lamp opposite the opening 72 of the housing will be illuminated to indicate the approximate position of the vehicle relative to the curbing. Thus when attempting to park the vehicle under any of the different conditions described, the driver will be advised of the approach or proximity of the same to the curbing, whether parking at night or during the day.

It will be understood that the order of operation of the lamps within the housing 68 with respect to the switch closing elements on the bumpers may be different from that described if desired. In other words, if preferred, the lamp openings 70 and 72 may correspond to the switch operating parts on the front bumper, while the openings 71 and 73 may be made to correspond to the switch closing elements of the rear bumper.

It will be further understood that when attempting to park the vehicle adjacent the curbing that should either of the wheels approach the latter nearer than intended or be moved into contact therewith, that the possibility of injury to the pivoted indicating elements 15 or 15a and associated parts will be prevented by reason of the fact that the parts 17 and 18 will readily yield under pressure when the part 18 is forced against the curbing. In other words, the yieldability of the spring 17 will permit the rubber tubing section 18 to swing to different angular positions relative to the rod 16 under the resistance offered by the curbing. Furthermore, should the wheel contact with the curbing, the spring 17 may yield sufficiently to allow the flexible element 18 to assume a substantially horizontal position upon the upper face of the curbing without injury to the parts. However, the spring 17 will return the part 18 to normal upright position as soon as it is released by movement of the vehicle away from the curbing. It will be understood, therefore, that the spring constitutes resilient means forming a pivotal support for the tubular section 18 permitting the latter to swing to different positions when pressure is applied thereto. This is true regardless of whether the pressure is applied laterally against the side of the member 18 or against the lower end thereof in a longitudinal direction through contact of said end with the pavement, or the surface of the road, as might occur if the wheel should drop into a depression or hole in the latter. Under such conditions the spring 17 will readily yield to permit the part 18 to temporarily assume an angular position with respect to the rod 16.

It will be understood that while the indicating means or the operating means therefor is shown applied to the bumper of the vehicle, said means may if desired be attached to some other part connected either with the frame or body of the vehicle.

It will be understood that the term "obstruction" used in the claims herein is intended to mean any object which may be contacted by the depending operating portion of the indicating means when operating the vehicle, regardless of whether or not such object may or may not constitute an actual obstruction to the vehicle itself.

I claim:

1. The combination with a motor vehicle, of curb indicating means comprising a substantially upright element supported upon the vehicle for a tilting movement, and having a flexible operating part located adjacent one side of the vehicle in position to be engaged and operated by a curb when the vehicle is moved to a predetermined position in proximity to the curb, and an indicating element located in a position visible to the driver of the motor vehicle and operatively connected to said upright element to be operated by movement thereof to indicate to said driver, through his sense of sight, the fact of such movement.

2. The combination with a motor vehicle, of curb indicating means comprising a substantially upright indicating unit, supported upon the vehicle and including cooperating relative movable parts, one normally in position to be operated through engagement with a curb when the vehicle is moved to a predetermined position in proximity to the curb, and an indicating element located in a position visible to the driver of the motor vehicle and operatively connected to said upright element to be operated by movement thereof to indicate to said driver, through his sense of sight, the fact of such movement.

3. The combination with a motor vehicle, of obstruction indicating means supported upon the vehicle, comprising an indicating part located in a position visible to the driver of the vehicle and an operating device for the indicating part including an upright member pivotally supported upon the vehicle and having a flexible actuating part movable relative thereto and operable to different angular positions relative to said member through engagement with an obstruction when the vehicle is moved to a predetermined position in proximity to the obstruction.

4. The combination with a motor vehicle, of obstruction indicating means supported upon the vehicle in position to be viewed by the driver thereof, and an operating device for the indicating means including a vertically disposed member mounted to swing upon the vehicle and having resilient actuating means on its lower end for engaging an obstruction when the vehicle is moved to a predetermined position in proximity to the obstruction, said resilient means being moved relative to said vertically disposed member by the obstruction through engagement therewith and automatically assuming normal position when freed by the obstruction.

5. The combination with a motor vehicle, of obstruction indicating means supported upon the vehicle in position to be viewed by the driver thereof, and an operating device for the indicating means including a vertically disposed member mounted to swing upon the vehicle and having a coiled spring on its lower end provided with a part for engagement with and operation by an obstruction when the vehicle is moved to a predetermined position in proximity to the obstruction, said spring and said part being moved by the obstruction relative to said vertically disposed member while swinging the latter and automatically assuming normal position when released by the obstruction.

6. The combination with a vehicle, of a unitary indicating device supported upon the vehicle for movement relative thereto including an operating part and an indicating part disposed exteriorly of the vehicle and responsive to the movement of the operating part to visibly indicate to an occupant of the vehicle the position of the latter relative to an object in proximity to the vehicle, said operating part being normally in position for engagement with and operation by the object when the vehicle is moved to a predetermined position relative to the object, said indicating part being located in a position visible to the driver of the vehicle so that the fact of operation of said indicating part by said operating part will be made known to the driver through his sense of sight, and means for automatically returning the indicating device to normal position when released by movement from engagement with the object.

7. The combination with a motor vehicle having a bumper, of supporting means on the bumper including a movable part, a vertically disposed element carried by said movable part having indicating means extending above the bumper to a position visible to the driver of the vehicle and including an operating part extending below the bumper in position to be engaged and operated by an obstruction when the vehicle is moved to a predetermined position in proximity to the obstruction whereby to shift said element and said movable part to effect movement of the upper part of said indicating means within the range of vision of said driver.

8. The combination with a motor vehicle having a bumper, of supporting means on the bumper including a spring pressed pivoted member, a vertically disposed element carried by said pivoted member having an operating part extending below the bumper in position to be engaged and operated by a curb when the vehicle is moved to a predetermined position in proximity to the curb to shift said element and said pivoted member, said element and said spring pressed pivoted member being automatically returned to normal position when said operating part is released by the curb, visual indicating means located within the range of vision of the driver of said vehicle, and means operatively connecting said indicating means to said pivoted member and operating part to operate said indicating means by movement of said pivoted member and operating part.

9. The combination with a motor vehicle having a bumper, of supporting means on the bumper comprising a fixed part and an adjustable part movable to different angular positions upon the fixed part, a spring pressed pivoted member on said adjustable part, a vertically disposed element on said pivoted member having an operating part extending below the bumper in position to be engaged and operated by a curb when the vehicle is moved to a predetermined position in proximity to the curb to shift said element and said pivoted member, said element and said pivoted member automatically returning to normal position upon release of said operating part by the curb, visual indicating means located within the range of vision of the driver of said vehicle, and means operatively connecting said indicating means to said pivoted member and operating part to operate said indicating means by movement of said pivoted member and operating part.

10. The combination with a motor vehicle having a bumper, of supporting means on the bumper comprising a swingingly mounted member having a holding part thereon, a vertically disposed element extending through said holding part for longitudinal adjustment therein, means on the holding part for retaining said element in adjusted position thereon, said vertically disposed element having its upper end within the range of vision of the driver of said vehicle and being provided at its lower end with a flexible part extending below the bumper for engagement with and operation by a curb when the vehicle is moved to a predetermined position in proximity to the curb to shift said element and said swingingly mounted member to effect movement of said upper end of said member so that the fact of engagement of said element with the curb may be made known to the driver through his sense of sight.

11. The combination with a motor vehicle having a bumper, of curb indicating means supported on the vehicle including a lamp mounted within the range of vision of the driver of the vehicle and an electric circuit and a normally open switch, and means movably supported on the bumper for closing said switch to operate said lamp, said means including a part depending from the bumper in position to be engaged and operated by a curb when the vehicle is moved to a predetermined position in proximity to the curb.

12. The combination with a motor vehicle, of curb indicating means supported on the vehicle including an element mounted for a swinging movement thereon and provided with a lamp mounted within the range of vision of the driver of the vehicle, an electric circuit, and a switch for the circuit normally in open position, said element having an operating part in position to be engaged and operated by a curb when the vehicle is moved to a predetermined position in proximity to the curb, said element when operated by said part serving to close said switch to light said lamp and thus to give to the driver of the vehicle a visual signal of proximity to the curb.

13. The combination with a motor vehicle, of curb indicating means supported on the vehicle including an element movable thereon and provided with a lamp having circuit connections and a switch for the circuit normally in open position, said lamp being mounted in a position visible to the driver of the vehicle, said element having a yieldable operating part in position to be engaged and operated by a curb when the vehicle is moved to a predetermined position in proximity to the curb, said element when operated by said yieldable part serving to close said switch and operate said lamp.

14. The combination with a motor vehicle having a bumper, of obstruction indicating means including a vertically disposed element mounted for movement upon the bumper and having parts extending above and below the bumper, a lamp on the part extending above the bumper having circuit connections and a switch for the circuit normally in open position, said lamp being in a position visible to the driver of the vehicle, the portion of said element below the bumper having a yieldable operating part in position to be engaged and operated by a curbing when the vehicle is moved to a predetermined position relative to the curbing, said element upon being moved by said operating part serving to close said switch, and means for returning said element to normal position when said operating portion is released by the curbing upon moving the vehicle therefrom.

15. The combination with a vehicle, of obstruction indicating means including a vertically disposed element pivotally supported intermediate its ends upon the vehicle and having an indicating part on its upper end in a position within the range of vision of the driver of the vehicle and a flexible operating part at its lower end for engagement with and operation by a curbing when parking the vehicle in a predetermined relation relative to the curbing whereby to effect movement of said indicating part, and means for returning said element to normal position when said flexible operating part is released by the curbing upon moving the vehicle therefrom.

16. In combination with a signal and circuit therefor, a vehicle, a switch mounted on the vehicle and including a movable member for closing the switch, said movable member projecting from the vehicle, means for mounting the switch so that the movable member will actuate the switch to close said circuit when said movable member engages a curb as the vehicle approaches within close proximity thereto while in the act of parking.

17. The combination with a motor vehicle, of a device movably mounted thereon and adapted to engage a curbstone or the like upon mere close approach of the vehicle to such curbstone, and visual means for indicating such engagement to the driver through his sense of sight.

18. The combination with a motor vehicle, of a lever pivoted thereto in approximately upright position, the upper arm of the lever being visible from the driver's seat, and the lower arm terminating in a position to strike a curbstone when the vehicle approaches closely enough thereto.

19. The combination with a motor vehicle, of a resilient rod movably mounted thereon, the rod having a portion located in a normal position to engage a curbstone or the like when the vehicle approaches closely enough thereto, and another portion of the rod being visible from the driver's seat.

20. The combination with a motor vehicle, of a lever pivoted thereto, the lower arm of the lever having a contact piece located in a normal position to engage a curbstone when the vehicle approaches closely enough thereto, and the upper arm of the lever having a knob visible from the driver's seat.

21. The combination with a motor vehicle, of a curbstone indicator pivoted thereto and comprising an arm depending from a part of the vehicle near one of the wheels to swing relatively to the vehicle upon contact with a curbstone or the like as the vehicle approaches such curbstone, and visual means for indicating to the driver when said arm so swings.

22. The combination with a vehicle fender or the like, of an arm pivoted thereto, the lower end of the arm terminating beyond one side of the vehicle in a position to engage a curbstone or the like as the vehicle approaches the latter, and means connected to said arm for automatically and visually indicating said engagement to the vehicle driver through his sense of sight.

23. A curb proximity signal for a motor vehicle, said signal including a member mounted on said vehicle near one side thereof and at an elevation susbtantially above the top of a curb of normal height, a feeler mounted on said member and depending approximately vertically therefrom to a position below said top of said curb and so placed that said feeler will strike against said curb and be deflected thereby when said vehicle is driven into close proximity to the curb, an indicating element mounted in a position visible to the driver of said vehicle, and means operatively connecting said feeler to said indicating element to operate said indicating element by deflection of said feeler.

24. A curb proximity signal for a motor vehicle, said signal including a member mounted on said vehicle near one side thereof and at an elvation substantally above the top of a curb of normal hight, a feeler mounted on said member and depending therefrom to a position below said top of said curb, the lower end of said feeler being located in a position offset outwardly beyond the outer edge of an adjacent vehicle wheel in a direction laterally with respect to said vehicle and offset materially beyond the center of rotation of said adjacent wheel in a direction longitudinally of the vehicle and being so placed that said feeler will strike against said curb and be deflected thereby when said vehicle is driven into close proximity to the curb, an indicating element mounted in a position visible to the driver of said vehicle, and means operatively connecting said feeler to said indicating element to operate said indicating element by deflection of said feeler.

25. A curb proximity signal for a motor vehicle, said signal including a member mounted on said vehicle near one side thereof and at an elevation substantially above the top of a curb of normal height, a feeler mounted on said member and depending therefrom to a position below said top of said curb, the lower end of said feeler being so placed that said feeler will strike against said curb and be deflected thereby when said vehicle is driven into close proximity to the curb, electrically operated indicating means, and electric circuit means controlled by movement of said feeler and operatively connected to said indicating means to operate said indicating means when said feeler is moved by contact with a curb.

WILLIAM J. PARKINSON.

CERTIFICATE OF CORRECTION.

Patent No. 2,143,997. January 17, 1939.

WILLIAM J. PARKINSON.

It is hereby certified that error appears in the printed specification of the above numbered patent requiring correction as follows: Page 4, second column, line 69, claim 2, after "unit" strike out the comma and insert instead the word movably; line 70, same claim, for "relative" read relatively; and that the said Letters Patent should be read with this correction therein that the same may conform to the record of the case in the Patent Office.

Signed and sealed this 28th day of March, A. D. 1939.

Henry Van Arsdale (Seal) Acting Commissioner of Patents.